P. T. MacNAMARA.
GRAVITY BATTERY ELECTRODE.
APPLICATION FILED APR. 6, 1916.
1,225,346.
Patented May 8, 1917.
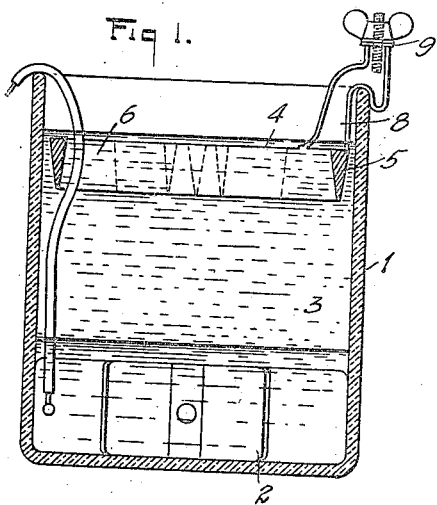
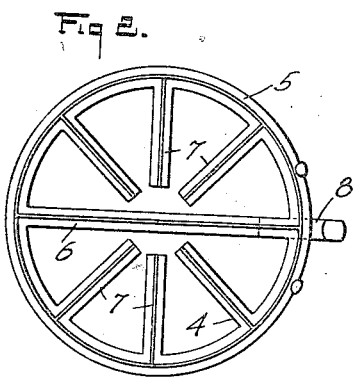

UNITED STATES PATENT OFFICE.

PATRICK T. MacNAMARA, OF NEW YORK, N. Y., ASSIGNOR TO THE WESTERN UNION TELEGRAPH COMPANY, OF NEW YORK, N. Y., A CORPORATION OF NEW YORK.

GRAVITY-BATTERY ELECTRODE.

1,225,346.  Specification of Letters Patent.  Patented May 8, 1917.

Application filed April 6, 1916. Serial No. 89,280.

*To all whom it may concern:*

Be it known that I, PATRICK T. MACNAMARA, a British subject, and a resident of the borough of Manhattan, city of New York, county of New York, and State of New York, have invented certain new and useful Gravity-Battery Electrodes, of which the following is a specification.

My invention relates to electrodes for primary batteries and the like, particularly gravity batteries, and comprises an improved form of electrode which has numerous advantages, as hereinafter pointed out.

The object of my invention is to improve the construction of battery electrodes, particularly negative electrodes of gravity cells, to obtain larger contact surface and greater electrical contact with the solution, to obtain lower internal resistance, to avoid accumulation of hydrogen on the surface of the electrode, to obtain greater evenness of surface current density, more even and smoother wear, to avoid premature falling off of any sector or limb of the electrode, to provide an electrode which shall remain more nearly clean and less subject to local action and which need not be removed from the solution for cleaning, and to provide an electrode which shall be more economical and shall give longer life with less labor than is the case with former electrodes.

I will now proceed to describe my invention with reference to the accompanying drawings and will then point out the novel features in claims:

Figure 1 shows a central vertical section of a battery of the gravity type provided with my improved electrode, such electrode being shown in part in section and in part in elevation.

Fig. 2 shows a bottom view of the electrode.

In the drawings 1 designates the battery jar, and 2 the positive electrode, and 3 the usual solution.

4 designates the negative electrode, embodying my invention. This negative electrode, 4, consists of an outer rim portion 5 of triangular cross-section, the point of the triangle being downward, such rim having a diametral portion 6 also of triangular cross-section, and having further a plurality of limbs 7 extending radially inward toward, but not in contact with, the diametral portion 6. This diametral portion is provided principally in order that there may be connected to the electrode the yoke 8, which fits over the edge of the jar 1, and is provided with the usual binding connection 9.

I find that the electrode thus constructed has smaller weight in proportion to cubical content of material than any other form of electrode known to me, and that this form gives larger contact surface, and greater electrical contact with the solution in the jar, than any other form of electrode known to me, and that there is less tendency with this electrode for saturation of and crystallization in the upper portion of the solution. I find further that this electrode gives lower internal resistance of the cell as a whole, and greater steadiness of current output; these qualities being due, probably, in large measure at least, to the fact that since all of the transverse sectional shapes of the electrode are triangular with the apex of the triangle downward, hydrogen evolved during the operation of the cell does not cling to the electrode, but passes up freely and is dissipated at the surface of the liquid; for which reason large portions of the surface of this electrode are not blanketed by hydrogen accumulations, as is commonly the case when prior forms of electrodes are used. Owing both to the freedom of the electrode from hydrogen accumulations, and to the practically uniform distribution of the material of the electrode through the cross-sectional area of the cell, this electrode gives greater evenness of surface current density, and wears evenly and smoothly without premature falling off of any sector or limb. It retains its triangular cross-section practically throughout its entire life, and has longer life and requires less attention than any other electrode known to me. In the past the negative electrodes of gravity cells have usually been made of zinc; but I prefer to make this electrode of cast-iron; for while the voltage of a copper-iron cell is somewhat less than that of a copper-zinc cell, the greater cheapness of the iron electrode as compared with the zinc electrode, together with the fact that the surface of the iron electrode remains cleaner and is less subject to local action, renders the iron electrode much preferable to the zinc electrode.

What I claim is:

1. A battery electrode comprising a member having a plurality of spaced limbs with connecting portions, such limbs and the connecting portions being of triangular cross-section with the point of the triangle downward.

2. A battery electrode comprising a peripheral portion having limbs extending therefrom, such peripheral portion and limbs being of triangular cross-section with the point of the triangle downward.

3. A battery electrode comprising a peripheral portion having limbs extending inwardly therefrom such peripheral portion, such limbs being of triangular cross-section with the point of the triangle downward.

4. A battery electrode comprising a body having a peripheral rim with a diametral member and with limbs extending radially inward toward the center, but not contacting with each other or with the said diametral member, such rim, diametral member and limbs all of triangular cross-section with the point of the triangle downward.

5. A battery electrode comprising a body provided with means for supporting it within a battery jar or container, the cross-sectional figure of such electrode being in general one affording a more or less sharp lower edge with sides extending obliquely upward, the section being devoid of flat horizontal lower surfaces upon which hydrogen may collect.

6. A battery electrode comprising a body having a rim with limbs extending therefrom, such rim and extending limbs being each of a cross-sectional figure having a more or less sharp lower edge with sides extending obliquely upward, the section being devoid of flat horizontal lower surfaces upon which hydrogen may collect.

In testimony whereof I have signed this specification in the presence of two subscribing witnesses.

PATRICK T. MacNAMARA.

Witnesses:
M. H. STOCKBERGER,
PAUL H. FRANKE.